(12) United States Patent
Lipsanen

(10) Patent No.: US 7,962,632 B2
(45) Date of Patent: Jun. 14, 2011

(54) HYBRID NETWORKS

(75) Inventor: Matti Lipsanen, Turku (FI)

(73) Assignee: Nokia Corporation, Espoo (FI)

( * ) Notice: Subject to any disclaimer, the term of this patent is extended or adjusted under 35 U.S.C. 154(b) by 1161 days.

(21) Appl. No.: 10/533,268

(22) PCT Filed: Nov. 3, 2003

(86) PCT No.: PCT/EP03/50784
§ 371 (c)(1),
(2), (4) Date: Apr. 28, 2005

(87) PCT Pub. No.: WO2004/040876
PCT Pub. Date: May 13, 2004

(65) Prior Publication Data
US 2006/0020547 A1    Jan. 26, 2006

(30) Foreign Application Priority Data

Oct. 1, 2002  (GB) .................................. 0225567.7

(51) Int. Cl.
*G06F 15/16* (2006.01)
(52) U.S. Cl. ........................................ 709/229; 709/239
(58) Field of Classification Search .................. 709/202, 709/203, 206, 217–219, 227, 228, 249, 239
See application file for complete search history.

(56) References Cited

U.S. PATENT DOCUMENTS

| | | | |
|---|---|---|---|
| 6,247,048 B1 * | 6/2001 | Greer et al. ................... | 709/219 |
| 6,314,108 B1 * | 11/2001 | Ramasubramani et al. .. | 370/465 |
| 6,618,763 B1 * | 9/2003 | Steinberg ...................... | 709/246 |

(Continued)

FOREIGN PATENT DOCUMENTS

WO    WO 01/35585    5/2001

(Continued)

OTHER PUBLICATIONS

Stamoulis, et al., "Efficient Agent-Based Negotiation for Telecommunications Services", Global Telecommunications Conference-Globecom 1999, Dec. 5, 1999, vol. 3, XP010373762, pp. 1989-1996.

(Continued)

*Primary Examiner* — David Lazaro
(74) *Attorney, Agent, or Firm* — Ditthavong Mori & Steiner, P.C.

(57) ABSTRACT

A user through a mobile or fixed terminal (5) informs an agent (33) hosted by an operator server (13) of subjects in respect of which content is requested. The agent (33) searches the internet for relevant content, and determines from a set of user preferences, relating to cost and timing of delivery preferences, a network for use in delivering the content to the terminal. Delivery may be made by a free network, e.g. a WLAN or Bluetooth network, if one is available, or over an expensive network such as a 3G, GSM or GPRS network if the content is requited quickly. If delivery is to be made over a broadcast network (11), such as a DVB-T network (11), a signal is sent to the terminal over a mobile telephone network (7) giving the time of broadcast, in response to which the terminal (5) enables its broadcast receiver at the appropriate time. Also, the agent (33) periodically reviews the content on a data carousel (45) which is awaiting broadcast, and informs the terminal (5) of any forthcoming content which is relevant to the user request.

27 Claims, 8 Drawing Sheets

U.S. PATENT DOCUMENTS

| | | | |
|---|---|---|---|
| 6,959,327 B1 * | 10/2005 | Vogl et al. | 709/219 |
| 7,116,970 B2 * | 10/2006 | Brusilovsky et al. | 455/411 |
| 7,433,929 B2 * | 10/2008 | Guilford et al. | 709/217 |
| 2002/0019871 A1 | 2/2002 | Asamoto et al. | 709/224 |
| 2002/0023092 A1 * | 2/2002 | Tamura et al. | 707/104.1 |
| 2002/0059453 A1 * | 5/2002 | Eriksson et al. | 709/238 |
| 2002/0073225 A1 | 6/2002 | Dillon et al. | 709/233 |
| 2002/0120696 A1 * | 8/2002 | Mousseau et al. | 709/206 |
| 2002/0198946 A1 * | 12/2002 | Wang et al. | 709/206 |
| 2003/0074443 A1 * | 4/2003 | Melaku et al. | 709/224 |
| 2003/0101150 A1 * | 5/2003 | Agnihotri et al. | 706/45 |

FOREIGN PATENT DOCUMENTS

WO      WO 02/44961 A1      6/2002

OTHER PUBLICATIONS

"Using intelligent agent to search renewed information of web station", Yin Tianjin, et al., Journal of Shenyang University of Technology, vol. 23, Issue 3, p. 214-217, Jun. 2001.

"An Internet information retrieval system based on agents", Wei Zizhong, et al., Computer Engineering & Design, vol. 22, Issue 2, p. 23-26, Apr. 2001.

* cited by examiner

HYBRID NETWORKS

FIELD OF THE INVENTION

The present invention relates to a hybrid network. The invention relates also to a content delivery method, to an agent connectable to a network and to a content delivery system.

BACKGROUND OF THE INVENTION

As a result of the perceived needs of the consumer, it is considered that the opportunities so offered by digital technology will result in a convergence of product features and capabilities. Such a convergence is already evident today in the provision of add-on and even integrated cellular telephony capabilities to the so-call personal data assistant (PDA) product category. Such convergence will undoubtedly bring advantages to the consumer in that she will no longer need to transport a range of devices with her.

However, from the perspective of the manufacturer and/or service provider, the convergence of products brings particular challenges. In the case of the manufacturer, such challenges include the need to integrate the functionality of what previously were devices having different operating systems, power requirements and such like, and typically all within a smaller, more compact form factor. For the service provider, the challenge is to provide existing and new services in a form which complements the synergies brought to the user by the convergence of functionality in the product.

SUMMARY OF THE INVENTION

According to a first aspect of the invention, there is provided a content delivery method comprising establishing a set of user preferences related to delivery of content, sourcing content in response to a request received from a terminal connected to a network and selecting based on said set of user preferences a network over which to deliver said content to said terminal.

This method can allow content to be delivered over a network which is most suitable to the user, providing flexibility of service. Allowing user preferences to be settable and to be acted on can allow a user to feel in control of content delivery services, which might cause the user to demand more content tin otherwise. Content delivery services using the method could be considered as customisable, and thus user-considerate. Also, if the user preferences are changeable, in response to changed service conditions or otherwise, the invention may allow a user confidence to subscribe to or merely request content which otherwise would have been missed, enriching user experience. The user preferences might relate to cost and/or delivery timing preferences.

The method preferably comprises maintaining in an agent a log of sourced content relating to the request, which could include an indication of the delivery status of the content. Such could allow a network straightforward management of content relating to the user, and avoid the user or the user's terminal having to ensure that all requested content has been delivered, and delivered fully and correctly.

Preferably, the method includes acknowledging receipt of the content over a or the duplex network which allows the preferred feature of updating the delivery status of the log on receiving an acknowledgement receipt.

In a preferred example, the method comprises notifying over a duplex network the terminal prior to the delivery of content over a simplex network. This is particularly advantageous since the enabling of a receiver for reception of content over a simplex network can consume power at relatively high rates, especially where the simplex network is a DVB network or similar. Power consumption minimisation is particularly important in mobile terminals.

The content may be selected by reviewing content items on a data carousel and determining from the reviewing step if any forthcoming content matches the user request or by conducting a search for content relating to the request, preferably using the internet. Searching for content on the internet is expected to be particularly prevalent in years to come. Using the invention, it may be possible to provide content relating to any given subject through regular searches, without the user having to instruct the search on each occasion.

To aid searching, the method may include comprising storing in an agent information relating to the last update of content relating to the request, and/or information relating to the user's time and/or frequency of updating preferences, and/or information relating to domains to which searching relating to the content request is limited.

According to a second aspect of the invention, there is provided an agent connectable to a network, the agent being operable to establish a set of user preferences relating to delivery of content to a user terminal, to source content in response to a user request, and to deliver said content to a user terminal over a network selected in dependence on said set of user preferences.

The agent preferably is arranged to maintain a log of sourced content relating to the request, which preferably includes an indication of the delivery status of the content. Advantageously, the agent is arranged to update the delivery status of the log on receiving an acknowledgement receipt.

The user preferences could relate to cost and/or delivery timing preferences.

The agent may comprise means for reviewing content items on a data carousel, and means for determining from the reviewing step if any forthcoming content matches the user request.

If the agent includes means for searching for content relating to the request, it also preferably includes means for storing information relating to the last update of content relating to the request, and/or means for storing information relating to the user's time and/or frequency of updating preferences, and/or means for storing information relating to domains to which searching relating to the content request is limited.

In accordance with a third aspect of the invention, there is provided a content delivery system comprising a first duplex network, a second network and a user terminal connectable to said first and second network, wherein the system further comprises an agent connectable to said first and second networks, the agent being operable to source content in response to a user request received from said user terminal via said first network, and to deliver said content to said terminal over a network selected in accordance with a set of user preferences.

User preferences could be established by the agent, or be generated by the terminal.

The second network could be a simplex network, such as a broadcast network, for example a DVB network. In such a case, it is particularly advantageous for the system to include means for notifying over the first network the terminal prior to the deliver of content over the second network. Instead of a simplex network, though, the second network could be a duplex network such as a Bluetooth network, or a network operating to any of the GPRS, GSK 3G or WLAN standards.

The agent might be arranged to maintain a log of sourced content relating to the request, and to maintain in the log an indication of the delivery status of the content.

If the terminal is arranged to acknowledge receipt of the content over the duplex network or one of the duplex networks, the agent preferably is arranged to update the delivery status in the log on receiving an acknowledgement receipt.

The user preferences could relate to cost and/or delivery timing preferences.

The system may comprise means for reviewing content items on a data carousel, and means for determining from the reviewing step if any forthcoming content matches the user request. Alternatively or in addition, the system could comprise means for conducting a search for content relating to the request, preferably using the internet. In either case, the agent preferably is arranged to store information relating to the last update of content relating to the request, and/or information relating to the user's time and/or frequency of updating preferences, and/or information relating to domains to which searching relating to the content request is limited.

Embodiments of the invention win be described, by way of example only, with reference to the accompanying drawings.

BRIEF DESCRIPTION OF THE DRAWINGS

In the drawings.

In the Figures, like reference numerals are used to refer to like elements throughout.

DETAILED DESCRIPTION OF THE PREFERRED EMBODIMENTS

Figure 1A:
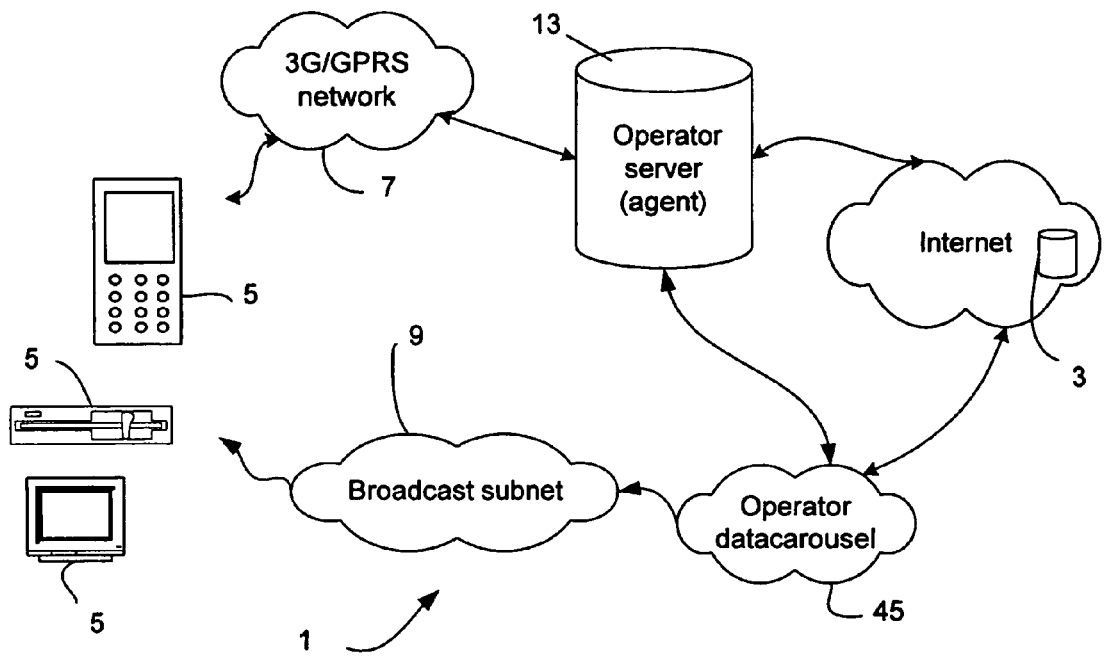
FIGS. 1a, 1b and 7 are diagrams illustrative of hybrid systems in accordance with one aspect of the present invention and including agents according to another aspect of the invention.
Figure 1B:
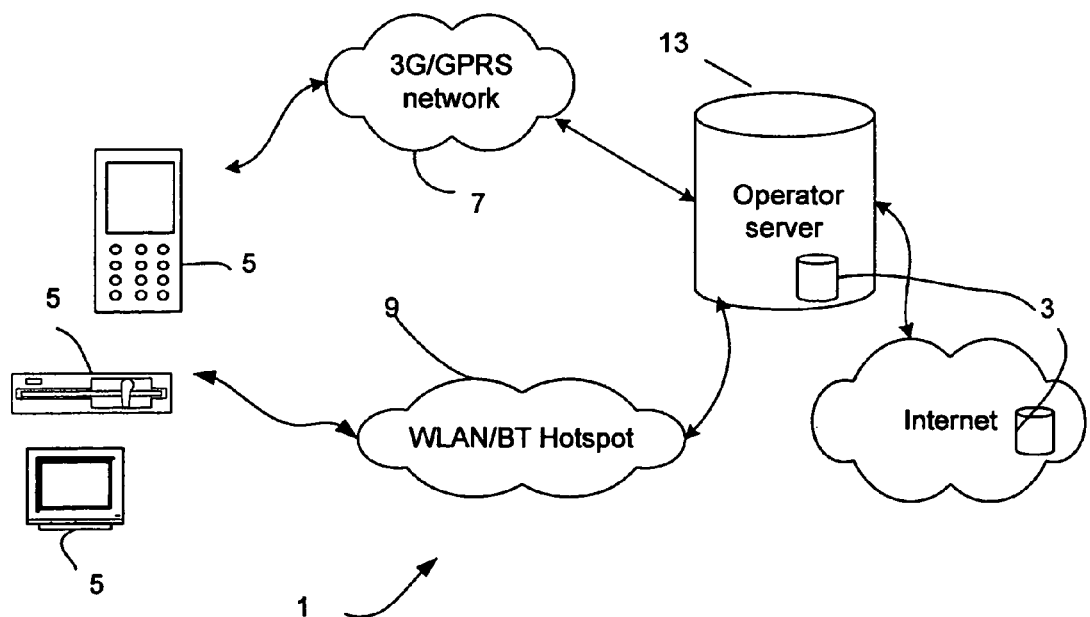

With reference to FIGS. 1a and 1b, there is shown a hybrid network 1 connectable to a source of content 3 on an intranet and/or the Internet. The hybrid network 1 includes a plurality of user-operated terminals 5, both mobile and fixed, a first duplex communication network 7, and in the case of FIG. 1a a second simplex broadband network 9 and in the case of FIG. 1b, a so-called 'hot-spot' 11 providing an access point to the source of content 3 using a wireless local area network including, but not limited to, a low power radio frequency network. Clearly, the hybrid network 1 can also comprise a combination of the above two examples in which both the second simplex broadband network 9 and at least one hot-spot 11 are available in conjunction with the first duplex network 7.

Figure 2:
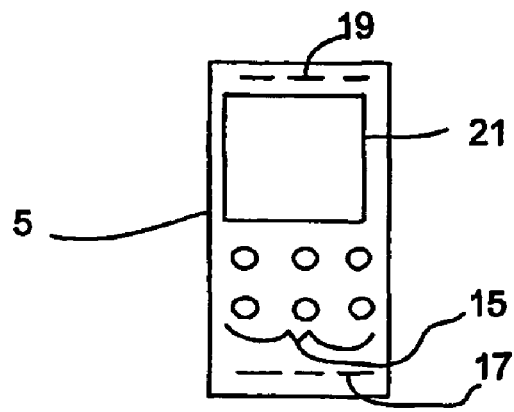
FIG. 2 is a schematic diagram of a mobile telephone and its user interface components.
Figure 3:
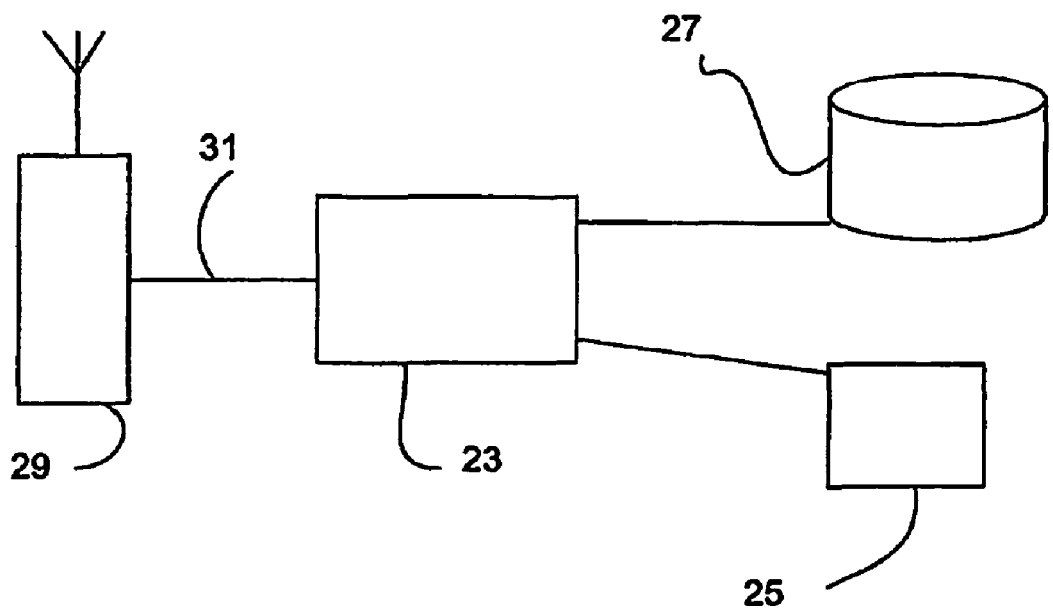
FIG. 3 is a schematic diagram illustrating operation of the FIG. 2 telephone.

FIG. 2 illustrates the main components relied upon by a user in interacting with a terminal 5. Thus, the terminal 5 includes a keypad 15, a microphone 17, a loudspeaker 19 and a display 21. The operation of these components is under the control of a controller 23 shown in more detail in FIG. 3. The controller 23 performs not only the tasks necessary to provide interaction with the user via the above described elements, but also ensures that the terminal 5 operates correctly within the hybrid network 7. Thus, the controller 23 is connected to a memory 25 for storage of instructions relevant to the operation of the terminal. User data is stored on long teem storage 27 such as flash media and the like, again the task of providing access to such data is carried by the controller 23. A transceiver section 29 connected to a bus 31 serving the controller 23 interprets radio frequency and/or infrared signals arriving at the terminal 5 and similarly converts output from the controller 23 into the appropriate radio frequency and/or infrared signals. The particular format of the signals received and transmitted by the terminal 5 is determined by the network portion 7, 11, 9 of the hybrid network with which the terminal is communicating. Thus, where the terminal 5 is in communication with the first duplex network 7, then the appropriate configuration of the transceiver section 29 is selected by the controller 23. Similarly, the transceiver section 29 is configured to match the requirements of the simplex network 9 or hot-spot 11 as appropriate.

Figure 4:
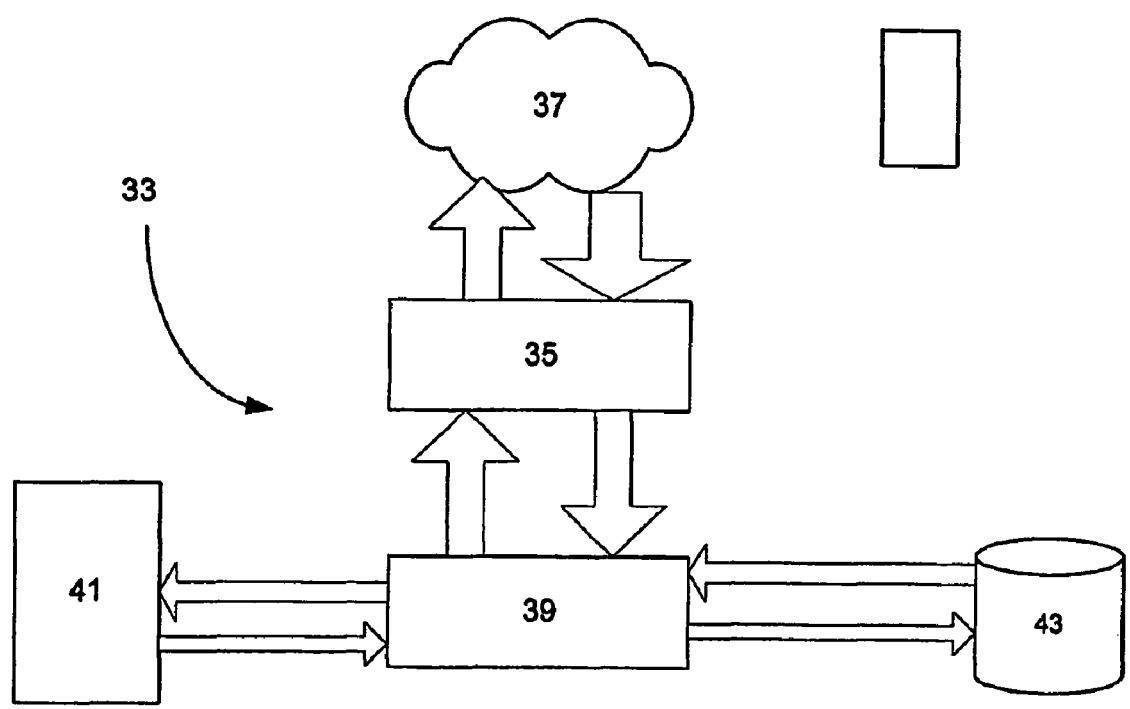
FIG. 4 is a schematic diagram of an agent according to one aspect of the invention and included in another aspect of the invention.

Turning now to FIG. 4, there is shown an agent 33 resident on a network element, which in this case is a server 13 (see FIG. 1a and FIG. 1b) under the control of the operator. The agent 33 can be a software application running on the server 13, although the agent may alternatively be provided in hardware or as a combination of software and hardware. Furthermore, the agent 33 may comprise a number of processes hereinafter referred to as modules each resident on one or more different distributed network elements.

The agent 33 has a communication module 35 which facilitates communication with external processes linked to it via a network connection 37 through the transmission and reception of data packets corresponding to a particular IP protocol, such as IPv6. The communication module 35 is arranged to determine those packets which are intended for delivery to the agent 33, and these packets are passed to a control module 39.

The control module 39 carries out the core processes of the agent 33 and as such has access to a log module 41 which module retains details of terminal 5 sessions, namely a list of activity which has taken place with respect to a particular terminal 5. The log module 41 further provides the controller with a mechanism for maintaining an indication of currently active sessions that are taking place with terminals. As terminals 5 enter into communication with the agent 33, respective entries are made in the log module 41 in accordance with instructions received from the control module 39. As has been mentioned, the log module 41 records any activity that takes place during a terminal session.

The control module 39 is further provided with access to a user preference module 43. This module 43 may be located on the server 13 in the sense that communication with the module 43 takes place directly between the control module 39 and the user preference module 43 or it may be distributed in the sense that communication with the user preference module 43 is made via the communication module 35 and network connection 37. Indeed, it may be that the log module is also distributed over the network. The user preference module 43 comprises a store of information relating to the individual preferences of a particular terminal, or a group of terminals such as those belonging to a particular entity (a company or an individual). The preferences provided by a user may include a definition of the cost and delivery timescale the user attaches to the receipt of particular content. As is described in more detail below, the agent 33 is provided with details of the particular content or service (these terms being used interchangeably throughout the specification) to be delivered to the user through a request generated either at the terminal or through a separate web-based interface, for example. The request may be generated in real-time in the sense that the agent 33 responds to the request during an interactive session exhibiting a low level of latency, or the request may be generated and then acted upon by the agent 33 at a later time, such as where resolution of the request is contingent upon a factor such a particular delivery method being available.

In the present embodiment, the communication between the terminal 5, the agent 33 and content provider is carried out utilizing the IPv6 protocol, although this should not be understood to limit the invention to use of this particular protocol since any suitable protocol, such as IPv4 for example, could be used.

Referring again to FIG. 1a and FIG. 1b, the first duplex communication network 7 is a cellular telephony network operating in accordance with one of many well-understood standards such as GSK GPRS, CDMA, WCDMA and the like. All such cellular telephony networks share the characteristic of serving a plurality of mobile terminals from a fixed network of base stations operated by a telecommunication network operator, hereinafter termed a network operator. The network operator may also provide services as a service provider, although the provision of services to terminal users may be carried out by service providers who need not themselves be responsible for provision of the network services. A further characteristic shared by such networks is that each utilizes a specific air interface and transmission technique. Thus, the transceiver section 29 of the terminal 5 is adapted to suit a particular air interface and transmission technique. In some terminals, there may exist the capability to have a plurality of transceiver configurations within one transceiver, rather than a plurality of transceivers within the transceiver section 29, such as is found in so-called software radios.

With respect to FIG. 1a, as has been mentioned above, the second simplex network 9 is provided by a simplex or unidirectional broadband network such as a terrestrial Digital Video Broadcast DVB-T network. The second simplex network includes a data carousel 45 which is operated by a service provider who may also be the network operator. The data carousel 45 is a form or repository into which services are placed and from which these services are selected for delivery over the second network to one or more terminals 5. In other words, the data carousel 45 comprises a number of files each corresponding to a service and these files are broadcast on a cyclical basis. The data carousel 45 has sufficient capacity to store a large number of services. Typically, the services will include content obtained from a content source 3.

In addition to the second network, FIG. 1a also shows the operator server 13 which forms part of the first duplex network 7. The operator server 13 also hosts the agent 33 and the agent 33 is capable of connecting via the communication module 35 to service providers via the Internet and also to the data carousel 45.

With respect to FIG. 1b, the second network is, as has already been indicated, a wireless LAN or LPRF hot-spot 11. As in the case of FIG. 1a, the operator server 13 forms part of the first duplex network 7. The operator server 13 also hosts the agent 33. The agent 33 is capable of connecting via the communication module 35 to service providers via the Internet and to the hot-spot 11.

Figure 5A:
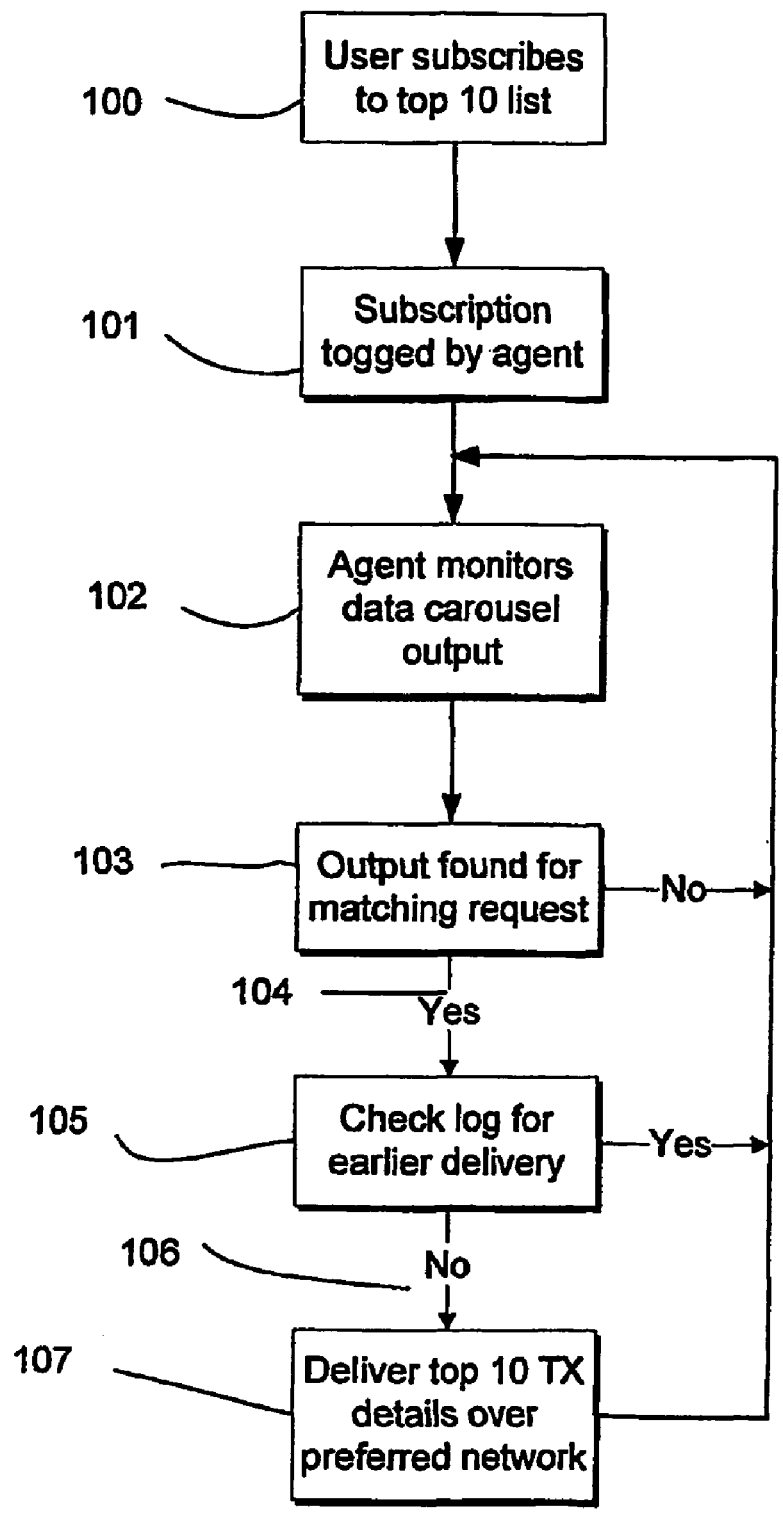
FIGS. 5a, 5b and 6 are flowcharts illustrating operation of the FIGS. 1a and 1b systems.
Figure 5B:
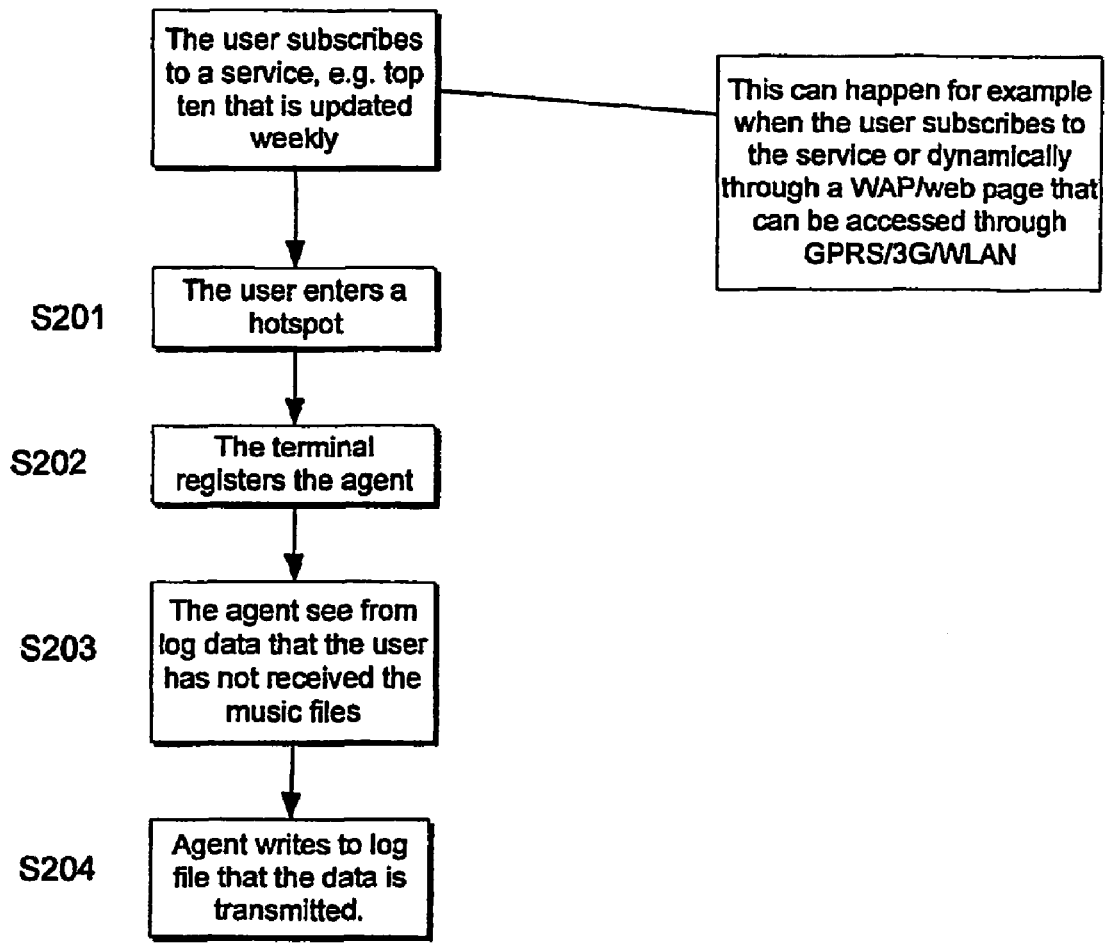
Figure 6:
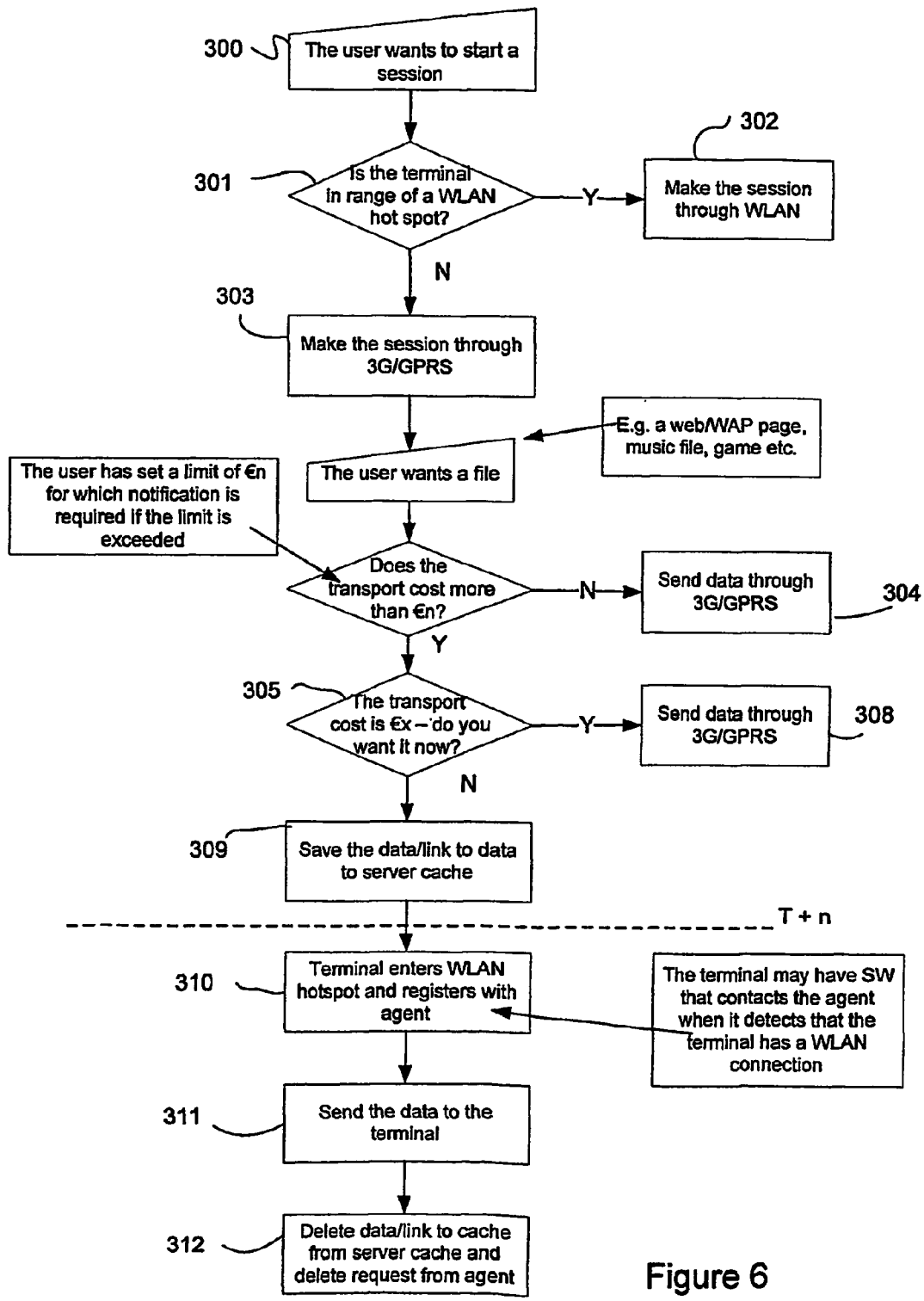

To understand the invention more completely, reference is made to the flowcharts of FIG. 5 and FIG. 6, in relation to the examples shown in FIGS. 1a and 1b respectively.

Firstly with reference to FIG. 5, in which a user enters a subscription for a particular service such as a top ten MP3 download list, which is updated on a once-per-week basis.

Initially, the user enters a subscription request at step 100 via a keyboard 15 input, the controller 23 interprets the input and the request is appropriately formatted before being delivered via the first duplex network 7 to the user preference module 43 where the subscription request is held at step 101.

The subscription request may additionally incorporate delivery parameters which the agent 33 should comply with when meeting the subscription request, the parameters being such as cost, time of delivery and the like.

Subsequently, at step 102, the control module 39 instructs the communication module 35 to select and then deliver packets of data identifying the forthcoming content of the data carousel 45 of the second simplex network 9 to the control module 39 for analysis. This is carried out on a periodic basis. On receipt of such packets, the control module 39 checks the preference module 43 to determine what subscription requests have been received. If the control module 39 determines at step 103 that a user subscription request held by the user preference module 43 identifies content forthcoming on the data carousel 45, the control module 39 proceeds at 104 to the next step 105, otherwise the control module 39 continues the process 102 of analysing packets of data identifying the forthcoming content of the data carousel 45.

Where content has been identified as forthcoming and of interest to the user, the control module 39 proceeds as follows. The control module 39 raises a query at step 105 with the log module 41 in order to determine the status of content delivery made to a terminal 5 of the user. In particular, the control module 39 attempts to determine from the log module 41 whether the specific content forthcoming on the data carousel 45 has previously been successfully delivered to the terminal 5. If the result of the query is negative in the sense that there is no log entry indicative of the content having been delivered, the control module 39 proceeds at 106 to step 107. Then, the control module 39 extracts, from the data identifying the forthcoming content, details of the transmission time and channel. These details are then passed to the communication channel in the form of a request 107 which is then delivered over the first duplex network 7 to the terminal 5 of the user.

The request is received by the transceiver section 29 of the terminal 5 and passed to the controller 23 where it is analysed such that the controller 23 recognises that a delivery of content over the second simplex network 9 is imminent. Consequently, the controller 23 ensures that the transceiver section 29 is reconfigured to receive the content over the second simplex network 9 at the previously informed delivery time. As a result, the terminal 5 is able to receive the desired content via the appropriately configured transceiver section 29 into storage 25 whereupon it may be consumed by the user in accordance with the distribution policies of the content provider. As a final step, once delivery of the content has occurred, the controller 23 sends a delivery acknowledgement message via the appropriately configured transceiver section 29 over the first duplex network 7, which message is addressed to the agent 33.

The acknowledgement message is accepted by the communication module 35 and passed to the control module 39 of the agent 33. The control module 39 ensures that the log module 41 is updated with a flag indicating successful delivery of the particular content.

In another example based on the same user preferences, the user enters a subscription request at step 200 via a keyboard 15 input, input is interpreted by the controller 23 and the request is appropriately formatted before being delivered via the first duplex network to the agent 33 and finally to the user preference module 43 where the subscription request is held. The subscription request may additionally incorporate delivery parameters which the agent 33 should comply with when meeting the subscription request such as cost, time of delivery and the like.

With reference to both FIG. 1b and FIG. 5b, the terminal is subsequently carried by the user into a hot-spot 11 provided by a Wireless Local Area Network WLAN, although similar functionality could be provided by a Low Power Radio Frequency hot-spot such as one provided by a Bluetooth transceiver. On entry to the hot-spot 11 at step S201, the terminal controller 23 is notified by the transceiver section 29 that the terminal 5 is now within the hot-spot 11. The controller 23 thereupon generates a notification announcement for delivery at step S202 to the agent 33. The notification announcement contains data indicative of the presence of the terminal 5 in the particular hot-spot 11. The announcement is sent via the appropriately configured transceiver section 29 over the second duplex network provided by the hot-spot 11 and ultimately is detected by the communication module 35 of the agent 33 and passed to the control module 39. The control module 39 thereupon determines that a user subscription request is being held by the user preference module 43 which request identifies specific content. The control module 39 then at step S203 raises a query with the log module 41 in order to determine the status of content delivery made to a terminal of the user. In particular, the control module 39 attempts to determine from the log module 41 whether the specific content has previous been successfully delivered to the terminal 5. If the result of the query is negative in the sense that there is no log entry indicative of the content having been delivered, the control module 39 proceeds to attempt to source the content from a content provider. Thus, the control module 39 either generates a search query using an appropriate search engine, which may be restricted to collections of content held by a particular content provider, to obtain a link to the content, or the source of the content is predefined in the sense that the user preferences provide an explicit link to the desired content. In either case, the control module 39 then downloads the content from the particular location 3 and forwards the content over the second duplex network or hot-spot 11 to the terminal 5 whereupon it may be consumed by the user in a manner appropriate to the distribution conditions imposed by the content provider. As a final step, once delivery of the content has occurred, the controller 23 sends at step S204 a delivery acknowledgement message via the appropriately configured transceiver section 29 over the second duplex network 11, which message is addressed to the agent 33.

The acknowledgement message is accepted by the communication module 35 and it is passed to the control module 39 of the agent 33. The control module 39 ensures at step 206 that the log module 41 is updated with a flag indicating successful delivery of the particular content.

In still another example, the user generates, using her terminal 5, an immediate request 300 for content in accordance with a possibly predefined set of preferences which include setting a maximum transport cost for the desired content of €n and a best efforts for minimum delivery latency subject to the overriding transport cost constraint. As described above, the user will have previously entered her subscription preferences request via a keyboard 15 input in which the controller 23 interprets the input and the request is appropriately formatted before being delivered via the first duplex network 7 to the user preference module 43 where the subscription request is held. The subscription request incorporates the aforementioned delivery parameters which the agent 33 must comply with when meeting the subscription request.

With particular reference again to FIG. 1b and FIG. 6, having received the immediate request for content the controller 23 determines at step 301 whether the terminal 5 is presently located in a hot-spot 11. If this is the case, the request is sent at step 302 via the appropriately configured transceiver section 29 over the second duplex network provided by the hot-spot 11 and ultimately is detected by the communication module 35 of the agent 33 and passed to the control module. The control module 39 thereupon determines that a user subscription request is being held by the user preference module 43, which request identifies specific content. Assuming the cost constraint is not broken by the intended delivery using the second duplex network 11, the control module 39 then proceeds to the next step in the process which is to attempt to source the content from a content provider. Thus, the control module 39 either generates a search query using an appropriate search engine which may be restricted to collections of content held by a particular content provider, in order to obtain a link to the content, or the source of the content is predefined in the sense that the user preferences provide an explicit link to the desired content. In either case, the control module 39 then downloads the content 13 from the particular location and forwards the content over the second duplex network 11 to the terminal 5 whereupon it may be consumed by the user in a manner appropriate to the distribution conditions imposed by the content provider. As a final step, once delivery of the content 3 has occurred, the controller 23 sends a delivery acknowledgement message via the appropriately configured transceiver section 29 over the second duplex network 11, which message is addressed to the agent 33.

However, where the terminal 5 is not located within a hot-spot 11 or the cost of delivery via the second hot-spot duplex network 11 exceeds €n, the controller 23 sends at 303 the request via the first duplex network 7 utilising the appropriately configured transceiver section 29. The request is received in the communications module 35 and passed to the control module 39 where the agent 33 seeks a delivery cost estimate from the first duplex network 7. Where the cost does not exceed in then the control module 39 proceeds by attempting to source the content from a content provider. Thus, the control module 39 either generates a search query using an appropriate search engine, which may be restricted to collections of content held by a particular content provider, in order to obtain a link to the content, or the source of the content is predefined in the sense that the user preferences provide an explicit link to the desired content. In either case, the control module 39 then downloads the content 3 from the particular location and forwards 304 the content 3 over the first duplex network 7 to the terminal 5 whereupon it may be consumed by the user in a manner appropriate to the distribution conditions imposed by the content provider. As a final step, once delivery of the content 3 has occurred, the controller 23 sends a delivery acknowledgement message via the appropriately configured transceiver section 29 over the first duplex network 7, which message is addressed to the agent 33.

In the event that immediate delivery is not possible over the first duplex network 7 because of the cost constraint, then the control module 29 generates a confirmation request for delivery 305 to the terminal 5 which when received over the first duplex network 7 by the transceiver section 29 is passed to the controller 23 and suitably formatted for presentation on the display 21 of the terminal 5, whereupon the user can elect whether to override the cost constant and request immediate delivery 306 or alternatively to confirm that the cost constraint should not be broken 307. In the former case 306, delivery 308 proceeds at a cost exceeding the constraint in the manner mentioned above, namely the control module 39 proceeds by attempting to source the content from a content provider. Thus, the control module 39 either generates a search query using an appropriate search engine, which may be restricted to collections of content held by a particular content provider, in order to obtain a link to the content, or the source of the content is predefined in the sense that the user preferences provide an explicit link to the desired content. In either case, the control module 39 then downloads the content 3 from the particular location and forwards the content over the first duplex network 7 to the terminal 5 whereupon it may be consumed by the user in a manner appropriate to the distribution conditions imposed by the content provider. As a final step, once delivery of the content 3 has occurred, the controller 23 sends a delivery acknowledgement message via the appropriately configured transceiver section 29 over the first duplex network 7, which message is addressed to the agent 33.

In the case where confirmation 307 is received from the terminal 5 that the delivery cost construct is not to be exceeded, the control module 39 proceeds by attempting to source the content from a content provider. Thus, the control module either generates a search query using an appropriate search engine, which may be restricted to collections of content held by a particular content provider, in order to obtain a link to the content, or the source of the content is predefined in the sense that the user preferences provide an explicit link to the desired content 3. This link to the desired content 3 is then logged 309 in the log module 41 and flagged as being an outstanding request to deliver content 3 to the terminal 5. Subsequently, when the terminal 5 enters a hot-spot 11 a notification announcement is generated at step 310 by the terminal 5. As previously described, the announcement is sent via the appropriately configured transceiver section 29 over the second duplex network provided by the hot-spot 11 and ultimately is detected by the communication module 35 of the agent 33 and passed to the control module 39. The control module 39 then raises a query with the log module 41 in order to determine the status of content delivery made to a terminal 5 of the user. In particular, the control module 39 attempts to determine from the log module 41 whether the specific content has previously been successfully delivered to the terminal 5. In this case, the control module 39 also determines that there is an outstanding delivery request for the specific content 3 and using the link provided by the log module 41, the agent 33 downloads the specific content 3 and forwards 311 the content 3 over the first duplex network 7 to the terminal whereupon it may be consumed by the user in a manner appropriate to the distribution conditions imposed by the content provider. As a final step, once delivery of the content 3 has occurred, the controller 23 sends a delivery acknowledgement message via the appropriately configured transceiver section 29 over the first duplex network 7, which message is addressed to the agent 33. On receipt of the acknowledgement message, the control module 39 is able to instruct the log module 41 to update 312 the log and to change the flag state to indicate successful delivery of the content 3.

Figure 7:
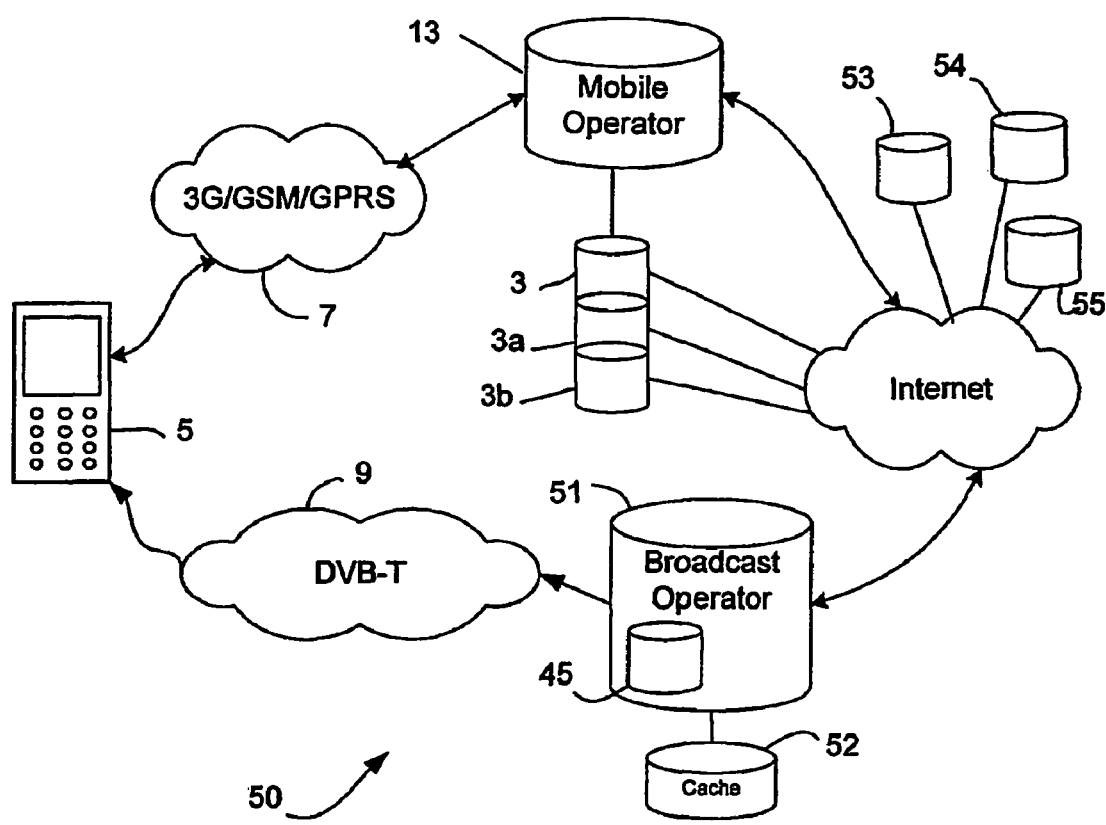

A further embodiment of the invention is now described with reference to FIGS. 7 and 8. Referring firstly to FIG. 7, a system 50 is based on the system of FIG. 1a, the description of which is not reproduced here for the sake of conciseness. The main differences are in the provision of plural agents 3, 3a, 3b, which are associated with the operator server 13 and the internet, and in the data carousel 45 being included within a broadcast operator server 51. A content cache 52 is connected to the broadcast operator server 51 to allow communication therebetween. Content servers 53, 54 and 55 are connected for interaction with the internet.

Figure 8:
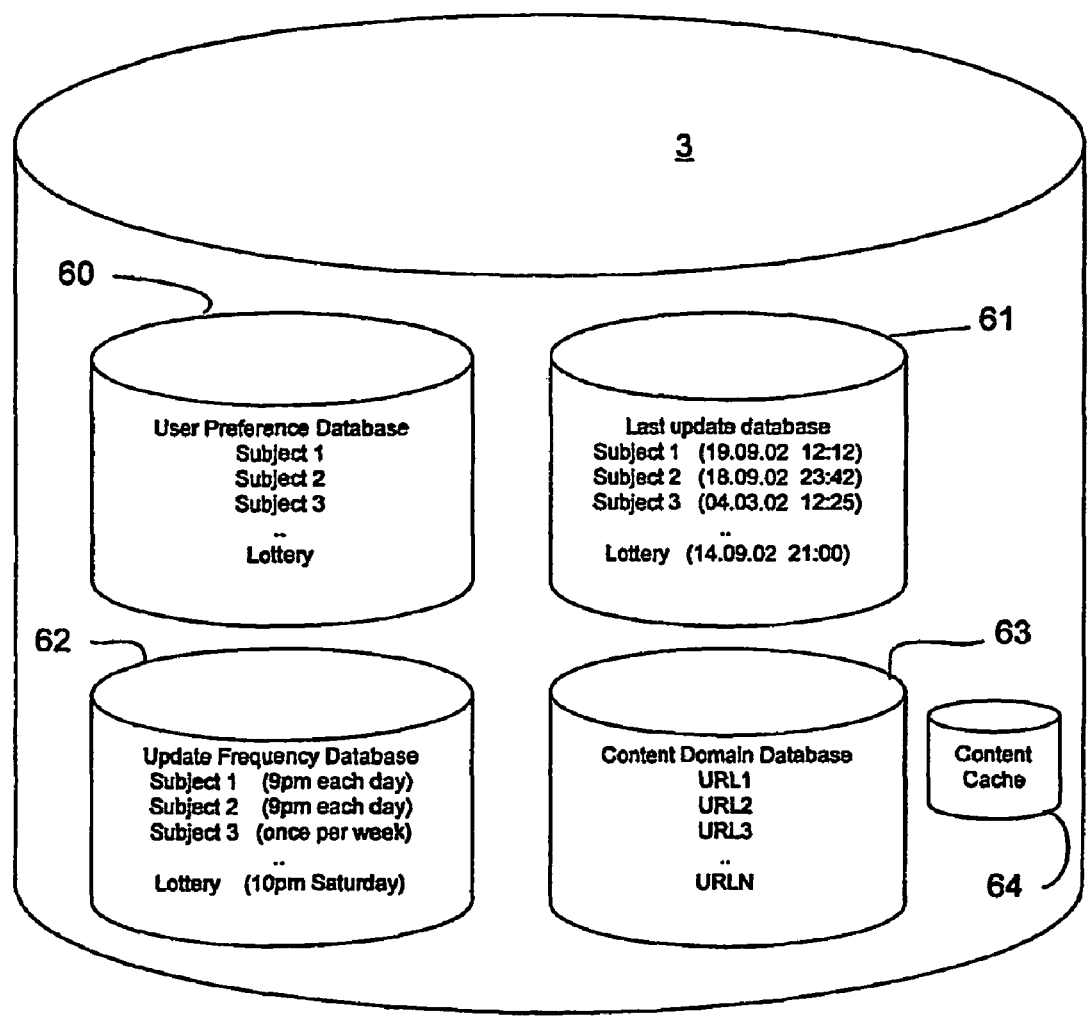
FIG. 8 is a schematic diagram of a preferred form of agent.

The agent 3 is shown in more detail in FIG. 8. The agent 3 includes a user preference database 60, a last update database 61, an update frequency database 62, a content domain database 63 and an agent content cache 64. The information shown in the databases 60 to 63 relate to a single user or group of users. Operation is as follows. A user of the terminal 5 decides on a subject on which information is required. The user then programs the terminal 5 with an identification of that subject, for example a sports team or a stock price, and frequency and optionally timing for which content relating to that subject is required. Optionally, the user specifies also the domains from which information is required to be sourced. The domains may be websites 53, 54, 55, specified by way of their URLS. The information programmed into the terminal 5 is transmitted by way of the duplex network 7 and the mobile operator server 13 to the agent 3, where the information is stored in the user preference database 60, the update frequency database 62 and the content domain database 63 as appropriate. The information stored in these databases 60, 62, 63 is amendable by a user by the sending of appropriate amending information from the terminal 5.

When content relating to a chosen subject is due for updating, as indicated by the information stored in the update frequency database 62, the agent 3 conducts a search though the internet for information relating to that subject. The search is limited to those domains 53-55 specified by the user, if there are any. If the agent 3 discovers any content which has been updated for the subject since its last search, the last update database 61 is marked with the time and date of the update, and the content is marked for delivery to the terminal 5. Content which has been sent to the terminal 5 previously is disregarded. Content which is marked for delivery and which the mobile operator server 13 determines is best transmitted using the DVB network 9, having regard to the user preferences, is sent to the broadcast operator 51 via the internet, where it is stored whilst awaiting a broadcast request. If the mobile operator server 13 and the broadcast operator server 51 are the same, which could occur if they are run by a single operator, the last step can be omitted. Once the content has been sent to the broadcast operator server 51, the mobile operator server 13 signals to the terminal 5 that content is ready for broadcast, and includes a request for confirmation that the content is required. This step may include an indication of the content, such as a document or program title and optionally a summary of the information contained. Once the terminal 5 signals that the user wants to receive the content, the mobile operator server 13 sends to the broadcast operator server 51 a broadcast request, which identifies the content and includes location information relating to the terminal, such as the cell in which the terminal is located. In response, the broadcast operator server 51 loads the content from the cache 52 to the data carousel 45, from where it is broadcasted to the terminal 5.

To minimise power consumption in the terminal 5, it is provided with information identifying the broadcast time. This could be specified by the user or by the terminal 5, and signalled to the broadcast operator server 51 via the mobile operator server 31.

Alternatively, it is to be specified by the mobile operator server 13. Most likely, though, the broadcast time is specified by the broadcast operator server 51, and the time information is signalled to the mobile operator server 51 for transmission to the terminal 5 over the duplex network 7.

The agent 3 may negotiate the transfer slot used to broadcast the content. For example, broadcasting content at night may be affordable to the user of the terminal 5 whereas broadcasting in the daytime might exceed the user's predefined cost limitations.

The agent 3a may serve as a group of users, for example supporters of a certain sports team. In this case, the information contained in the databases 60, 62, 63 may be specified by a designated terminal. The agent 3a, through the mobile 13, arranges for plural members of the group to expect content delivery over the DVB network 9 at a time specified by the broadcast operator server 51. The content remains in the data carousel 45 either until it has been successfully delivered to all members of the group, until the content is no longer relevant, for example because it has been updated, or until a timeout value has been exceeded.

Alternatively, the agent 3a may store user preferences for each of the users in the group. The user preferences relate to cost and delivery timing preferences. A first user, for example, may request content update at two hourly intervals between 9 am and 11 pm, and require delivery over a pay-network only if the content cannot be delivered free within 30 minutes of the update time and if the cost of delivery for a two-hour period does not exceed one Euro. A second user may request content update daily at 8 pm, and not require delivery over a pay-network under any circumstances. Data indicative of these preferences is stored in the agent 3a.

The agent 3a also sources content relating to a subject in respect of which the users of the group are interested and to which the agent 3a is dedicated. Content is sourced from the Internet, by way of periodic searches.

Periodically, for example every five minutes, the agent 3a determines which of the users an item of content is destined for delivery to. This decision is made on the basis of the user preferences as regards update time and frequency. If a suitably large number of users are deemed to require the content, then a slot for broadcast is negotiated with the DVB-T operator 51. Once the broadcast details are known, the agent 3a informs each of the relevant users of the broadcast details in any suitable manner over the network 7. Each of the users in the group which received the broadcast then sends a confirmation message to the agent 3a, which updates its database. Some users will not receive the broadcast, for example because they do not have a DVB-T receiver, because their device was switched-off and so on. The users which did not receive the broadcast are identified and listed. Those users whose user preferences would be met if the content were not delivered until the next broadcast (where details of the broadcast are known) are identified, and removed from the list. In respect of each of the users remaining on the list, delivery is made, if possible, on a network selected according to the user's preferences and according to the networks to which the user has access or to which the user gains access. For those listed users which have repeatedly missed broadcasts and those for which it is known that reception from the DVB-T network 51 is not possible, special considerations are made. In particular, the users are continually monitored to determine whether they have entered a 'hot-spot' over which content can be delivered without charge to the operator. Monitoring may involve periodic poling of the users, or requesting the users to report to the agent 3a when access to a hot-spot is possible. In this way, content delivery can be made via the hot-spot if one becomes available. Once users are deemed to have received the content, the database is updated, and they are removed from the list. Delivery may be made via a GPPS or GSM network as the user preferences indicate that the end of an acceptable period for content delivery is imminent and if the user will tolerate the associated charges.

As an enhancement, each user in the group may set a relevance level of required content. For example, a user requiring content at a high relevance level may be cause to receive only content which is deemed to be very relevant to the subject. A user not having a high relevance level setting may be caused to receive the content which is very relevant as well as content which is less relevant. Relevance may be determined on the basis of a computer classification, using a scheme similar to that used in Internet search engines for example.

It is not necessary that the terminal 5 be provided with user interface output devices suitable for delivering the content. For example, in an unshown embodiment, a PC (personal computer) may be connected to a wireless terminal via an infra-red, Bluetooth™ or a USB (universal serial bus) connection. In this example, the PC may be used to control the terminal 5 to request information services, with broadcasts received by the terminal and forwarded to the PC for storage and/or immediate consumption. In this example, authentication of the mobile terminal on the duplex network 7 is required, which can be made by way of a SIM (subscriber identity module) or IMSI (international mobile subscriber identity).

The above-described embodiments are illustrative only, and are not intended to be limiting on the scope of protection afforded. Any feature specified as being preferable or optional is not essential, but instead may be omitted entirely or alternatively replaced by another feature. Anything which is said 'may' be present or 'may' have some characteristic also is preferable, and could be omitted or instead replaced with another feature or characteristic. The scope of protection is to be limited only by the accompanying claims and their equivalents.

The invention claimed is:

1. A method comprising:
 establishing a set of user content delivery preferences relating to user content, wherein the set of user content delivery preferences comprises a delivery cost constraint for delivery of the user content to a terminal;
 receiving a request for the delivery of the user content to the terminal;
 maintaining a log of session activities that have occurred with respect to the terminal; and
 wherein one or more networks are available for delivery of said user content, and none of the one or more available networks would satisfy the delivery cost constraint, and
 wherein at least one other network becomes available, selecting the other network for delivery of the user content based on at least a cost for delivery of the user content in view of the cost constraint.

2. The method of claim 1, wherein the log of session activities comprises a log of sourced user content relating to the request.

3. The method of claim 2, wherein the log of session activities further comprises an indication of the delivery status of the user content.

4. The method of claim 3, further comprising acknowledging receipt of the user content over a duplex network.

5. The method of claim 4, further comprising updating the delivery status of the log on receiving an acknowledgement receipt.

6. The method of claim 1, further comprising notifying over a duplex network the terminal prior to the delivery of the user content over a simplex network.

7. The method of claim 1, further comprising reviewing data stored on a data carousel, and determining if any of the data stored on the data carousel matches the requested user content.

8. The method of claim 1, further comprising generating a search query to a content provider to obtain the requested user content, using a network, if an explicit link to the user content has not been provided.

9. The method of claim 1, further comprising storing at least one of information relating to the last update of user content relating to the request, information relating to the user's time and/or frequency of updating preferences, and information relating to domains to which searching relating to the user content request is limited.

10. The method of claim 1, further comprising storing user preferences relating to plural users, sourcing an item of user content, sending the user content to plural users, and wherein the log of session activities comprises a log of which ones of the plural users have received the item of user content.

11. The method of claim 10, in which the plural users each are able to define a relevance level of user content of which they require delivery.

12. The method of claim 10, comprising periodically sourcing content, and using the user preferences for the plural users to determine which ones of the plural users has subscribed to the sourced content.

13. The method of claim 1 further comprising:
scheduling the delivery of the user content to limit an amount of time the terminal is connected to the selected network.

14. The method of claim 1 wherein the set of user content delivery preferences further comprises an identification of at least one domain from which content is to be sourced.

15. The method of claim 1 further comprising:
automating multiple user content delivery events at different times in response to the request without further user interaction.

16. The method of claim 1, where the set of user content delivery preferences further comprises a user content delivery latency, where the delivery latency is subject to the delivery cost constraint.

17. The method of claim 1, where selecting comprises requesting a delivery cost estimate for at least one of the plurality of networks.

18. The method of claim 1, wherein none of the plurality of available networks would satisfy the delivery cost constraint, the method further comprising,
providing a notification to the terminal, and
providing an option to override the delivery cost constraint.

19. An apparatus comprising:
at least one memory storing a computer program; and
at least one controller;
the at least one memory and the computer program, with the at least one controller configured to cause the apparatus to perform at least the following operations,
establishing a set of user content delivery preferences relating to user content, wherein the set of user content delivery preferences comprises a delivery cost constraint for delivery of the user content to a terminal;
receiving a request for the delivery of the user content to the terminal;
maintaining a log of session activities that have occurred with respect to the terminal; and
wherein one or more networks are available for delivery of said user content, and none of the one or more available networks would satisfy the delivery cost constraint, and
wherein at least one other network becomes available, selecting the other network for delivery of the user content based on at least a cost for delivery of the user content in view of the cost constraint.

20. The apparatus of claim 19 wherein the operations further comprise:
scheduling the delivery of the user content to limit an amount of time the terminal is connected to the selected network.

21. The apparatus of claim 19 wherein the set of user content delivery preferences further comprises an identification of at least one domain from which content is to be sourced.

22. The apparatus of claim 19 wherein the operations further comprise:
automating multiple user content delivery events at different times in response to the request without further user interaction.

23. The apparatus of claim 19, where the set of user content delivery preferences further comprises a user content delivery latency, where the delivery latency is subject to the delivery cost constraint.

24. The apparatus of claim 19, where the operation of selecting comprises an operation of requesting a delivery cost estimate for at least one of the plurality of available networks.

25. The apparatus of claim 19, wherein none of the plurality of available networks would satisfy the delivery cost constraint, the operations further comprise:
providing a notification to the terminal; and
providing an option to override the delivery cost constraint.

26. The apparatus of claim 19, wherein the log of session activities comprises a log of sourced user content relating to the request.

27. The apparatus of claim 26, wherein the log of session activities further comprises an indication of the delivery status of the user content.

* * * * *